Figure 1:
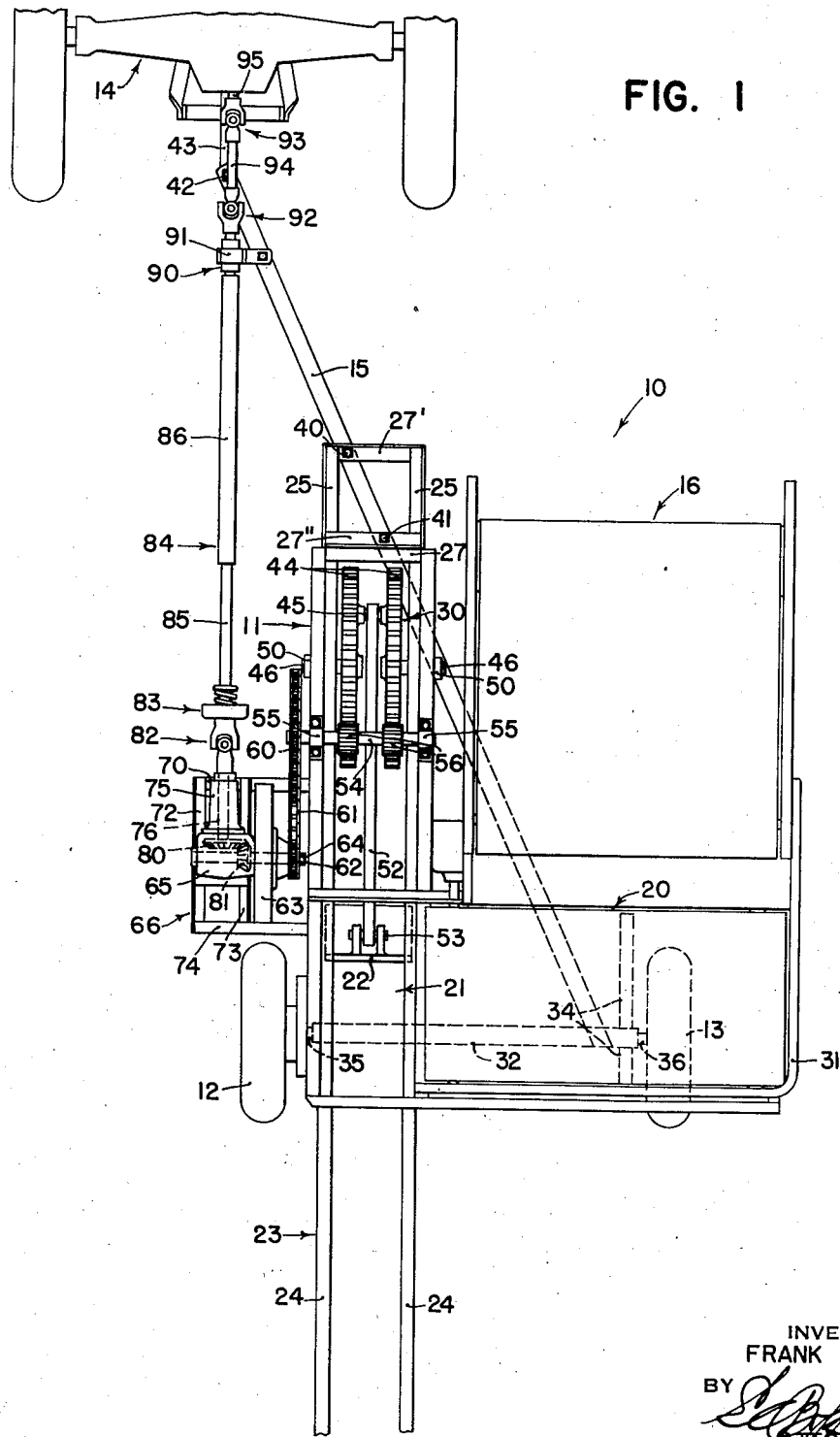

June 27, 1944.    F. D. JONES    2,352,388
HAY PRESS
Filed Feb. 14, 1942    2 Sheets-Sheet 1

INVENTOR
FRANK D. JONES
BY
ATTORNEY

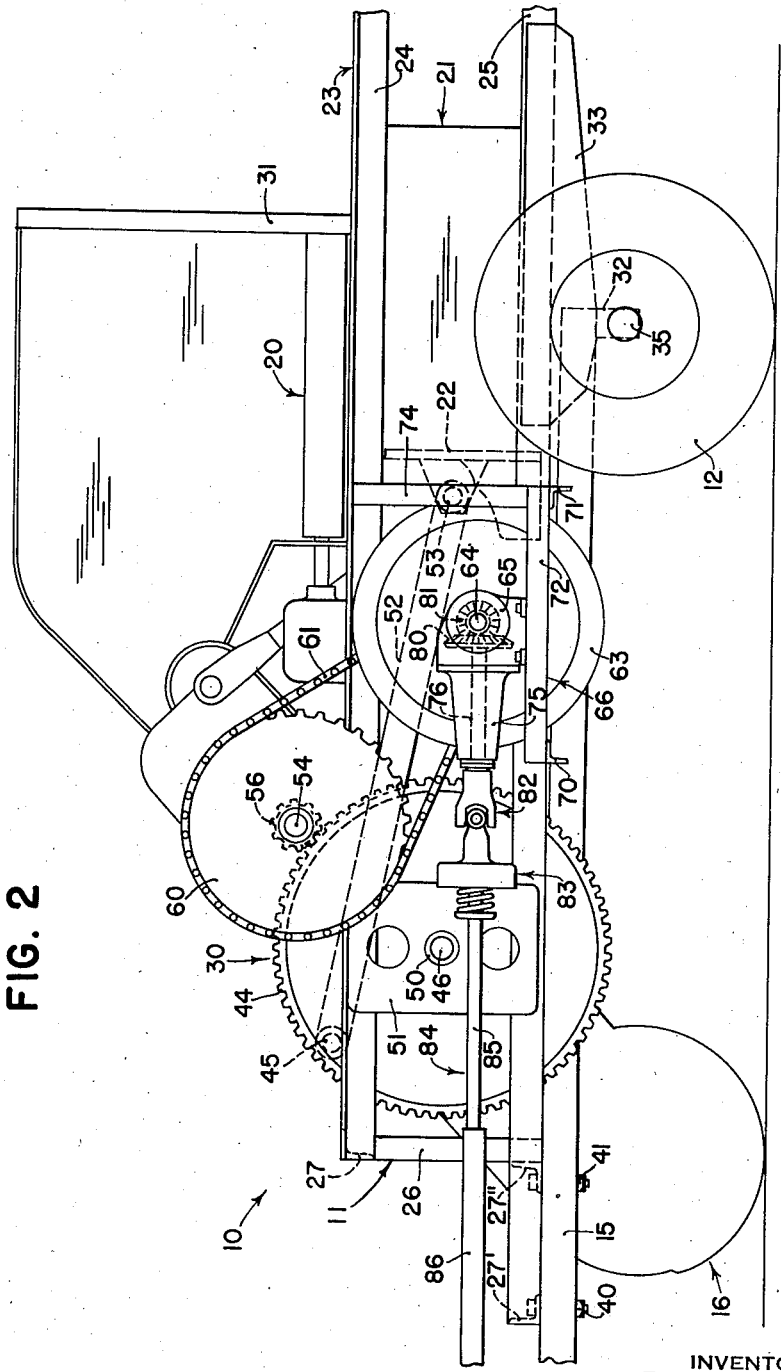

Patented June 27, 1944

2,352,388

UNITED STATES PATENT OFFICE 2,352,388

HAY PRESS

Frank D. Jones, Ottumwa, Iowa, assignor to Dain Manufacturing Company of Iowa, Ottumwa, Iowa, a corporation of Iowa Application February 14, 1942, Serial No. 430,914

3 Claims. (Cl. 100—3)

The present invention relates to tractor drawn hay presses and is more particularly concerned with that class of hay presses wherein the frame is supported on a pair of laterally spaced wheels and on the drawbar of the tractor.

The object and general nature of the invention has to do with the provision of an improved hay press so constructed and arranged that the heavy flywheel of the machine is located on the strongest part of the frame near the axis of the supporting wheels, thereby relieving the frame of the excessive stresses imposed thereon when the flywheel is located near the front end of the frame, as is customary in present machines.

One of the features of the present invention resides in the arrangement of the flywheel at the side of the baling mechanism and to the rear of and below the axis of the baling mechanism bull gear, thereby improving the balance and stability of the machine, and at the same time making it possible to reduce the overall width of the machine to comply with increasingly stricter highway restrictions on vehicles traveling thereon.

Another feature of the invention has to do with the provision of a hay press driven from the power take-off shaft of the propelling tractor and having a flywheel connected with said power take-off shaft so as to rotate at a higher speed than the latter, whereby the momentum is increased and the effectiveness of the flywheel in maintaining a constant driving speed to the baling mechanism is greatly improved.

Still another feature of the invention lies in the provision of a diagonally disposed draft member which is connected at its rear end to the laterally outer end of the axle beam and at its front end to the tractor drawbar, and which is fixed to the front end of the baler frame so that the weight of the baling mechanism is largely supported on the said draft member and the frame itself is relieved of the stresses that would otherwise result from supporting such mechanism at a considerable distance from the axis of the supporting wheels.

These and other objects and advantageous features of the present invention will become apparent to those skilled in the art after consideration of the following detailed description of the preferred embodiment thereof, reference being had to the accompanying drawings, in which Figure 1 is a top plan view of a tractor drawn pick-up baling press embodying the principles of my invention; and Figure 2 is a side elevational view of the same.

Referring now to the drawings, the pick-up baler is indicated in its entirety by the reference numeral 10 and consists of a fore and aft extending main frame 11 which is supported intermediate its ends on a pair of laterally spaced supporting wheels 12 and 13. The baler 10 is adapted to be towed behind a tractor 14, and is connected therewith by a draft member 15 which is arranged so that the baler frame 11 is normally disposed to the right of the longitudinal center line of the tractor. A pick-up unit 16 is disposed alongside the baler frame 11 ahead of the wheels 12, 13, and is adapted to pick up a windrow from the ground and to convey the crop up to a cross conveyor 20 which discharges the material into a baling chamber 21 where it is compressed by a reciprocating plunger 22 into bales which are pushed rearwardly from the baling chamber along a baler case, indicated at 23.

The main frame 11 of the baler comprises fore and aft extending upper and lower angle irons 24 and 25, respectively, which are connected together in the usual way by vertical members 26 and transverse members 27 to form a rectangular structure, the front end of which supports the baling mechanism 30 and the rear end of which constitutes the baler case 23, with the baling chamber 21 disposed substantially directly above the axis of the supporting wheels. The cross conveyor 20 may be of any conventional type and is mounted on a suitable supporting frame 31 which is fixed to the right hand side of the main frame 11 and extends laterally therefrom. The pick-up unit 16 is likewise conventional in construction and is pivoted at its upper end to the leading edge of the frame 31 for vertical swinging to allow the lower end of the unit to follow the contour of the ground.

A transversely disposed box beam 32 is fixed by bracket members 33 to the lower angle irons 25 of the main frame 11 beneath the baling chamber 21 and extends laterally therefrom beneath the conveyor frame 31. The outer end of the beam 32 is fixed to the conveyor frame 31 by members 34. The supporting wheels 12 and 13 are journaled on stub axles 35 and 36, respectively, which are fixed to the ends of the beam 32.

The diagonal draft member 15 is fixed at its rear end to the outer or right hand end of the beam 32 and passes diagonally forwardly under the front end of the main frame 11. The lower angle irons 25 extend forwardly ahead of the upper angle irons 24, and are joined together at their front ends by a cross member 27', to which the draft beam 15 is bolted at 40. The draft beam 15 is also bolted at 41 to a second cross piece 27'' that is spaced a short distance behind 27', and is connected at its front end by a hitch pin 42 to the drawbar 43 of the tractor.

The baling mechanism 30 is adapted to be driven from the power take-off shaft of the tractor, and preferably comprises a pair of laterally spaced bull gears 44 which are arranged side by side for rotation about a common transverse axis and which are connected together near their peripheries by a crank pin 45. The bull gears 44 are journaled on stub axles 46 which are fixedly secured within apertured bosses 50 provided on plates 51 fixed to the sides of angle irons 24 and 25. A pitman 52 is disposed between the bull gears 44 and is journaled at one end on the crank pin 45 and connected at the other end by a wrist pin 53 to the plunger 22.

The bull gears 44 are driven by a transversely disposed jack shaft 54 which is positioned to the rear of the axles 46 and is journaled in bearings 55 fixed to the tops of the upper angle irons 24. Pinions 56 are fixed to the jack shaft 54 and mesh with the bull gears 44. A large sprocket wheel 60 is fixed to the left hand end of the jack shaft on the outside of the bearing 55, and this sprocket wheel is driven by a chain 61 which extends downwardly and rearwardly from the jack shaft and is trained around a sprocket 62.

Fixed to the sprocket 62 as an integral part thereof is a flywheel 63 which is journaled on a transversely disposed shaft 64 and is operatively connected therewith by an over-running clutch (not shown). The shaft 64 is journaled in suitable bearings in a gear box 65 disposed alongside the main frame 11 substantially in line with the longitudinal center line of the tractor. The gear box 65 is mounted on a platform or secondary frame 66 built onto the side of the main frame 11. The frame 66 preferably consists of a pair of fore and aft spaced, laterally extending angle irons 70 and 71 which are fixed to the lower frame members 25 and are joined together by cross pieces 72 and 73. An angle iron bracing member 74 is fixed to the rear end of the outer cross piece 72 and arches upwardly therefrom to connect with the upper frame member 24 for bracing the platform to carry the weight of the gear box 65 and flywheel 63. The gear box 65 has a forwardly extending barrel portion 75, and journaled in this barrel portion 75 is a fore and aft extending shaft 76 which projects from the front end thereof. A bevel gear 80 is fixed to the rear end of the shaft 76 and meshes with a bevel pinion 81 fixed to the shaft 64, so that shaft 64 is driven at a higher speed than shaft 76.

The front end of the shaft 76 is connected by a universal joint 82 and slip clutch 83 to a telescoping shaft 84, which preferably consists of a square shaft 85 slidably disposed within a square pipe 86. A cylindrical bearing portion 90 is provided on the front end of the square pipe 86 and is journaled in a bearing bracket 91 bolted to the draft member 15. The front end of the telescoping shaft 84 is connected by universal joints 92 and 93, and by a short shaft 94 to the rearwardly extending power take-off shaft 95 of the tractor 14.

It is believed that the operation of my improved hay press will be clearly understood from the foregoing description. Power derived from the power take-off shaft 95 of the tractor is transmitted back to the flywheel 63 through the power transmission mechanism 64—93, inclusive, driving the flywheel at a higher speed than the speed of the power take-off shaft to obtain greater momentum in the flywheel. From the flywheel 63, power is transmitted back to the bull gears 44 through the chain 61 and sprockets 62, 60 and pinions 56 to drive the bull gears at a greatly reduced speed. The pick-up 16 and cross conveyor 20 may be driven either from one of the supporting wheels 12, 13, or from one of the members of the power transmission mechanism that drives the bull gears, as desired, and since the details of the construction of the pick-up and cross conveyor and the driving means therefor form no part of the present invention, such details have been omitted herein.

The arrangement of the flywheel 63 and gear box 65 at the side of the main frame 11 and closely adjacent the axis of the supporting wheels 12, 13, provides a compact, well balanced machine having great strength and rigidity which is further enhanced by the diagonal draft member 15 connected at 40 and 41 to the front end of the main frame 11 and fixed to the right hand end of the beam 32.

What I claim as my invention is:

1. A field hay press comprising, in combination, a fore and aft extending main frame supported on a pair of laterally spaced wheels journaled on the intermediate portion of the frame, a draft member rigidly attached to said main frame and extending forwardly and laterally to a point of draft connection outside of the planes of rotation of said wheels, baling mechanism carried on said frame, a bull gear journaled near the forward end of said frame for rotation about a transverse axis and connected with said baling mechanism to drive the latter, a secondary frame fixed to the side of said main frame and extending laterally therefrom in the direction of offset of said point of draft connection, a gear box mounted on said secondary frame and disposed outside the plane of rotation of the adjacent wheel substantially in longitudinal alignment with said point of draft connection, a power shaft extending forwardly from said gear box and rotatably supported near the front end of said draft member and adapted to receive power from a tractor, a second shaft extending laterally inwardly from said gear box toward said main frame and suitably connected within said gear box with said power shaft, a flywheel mounted on said second shaft, and a flexible endless power transmitting member extending forwardly to connect said second shaft in driving relation with said bull gear.

2. A field hay press comprising, in combination, a fore and aft extending main frame, a transverse supporting axle at the intermediate portion of said frame, wheels mounted on opposite ends of said axle outside said frame, a draft member connected adjacent one end of said axle and extending obliquely forwardly and laterally beyond the forward end of said frame to a point of draft connection outside the plane of rotation of the wheel at the other end of said axle, means supporting the forward end of said main frame on the intermediate portion of said draft member, the latter being adapted to be pivotally supported on a tractor, baling mechanism carried on said frame, a bull gear journaled near the forward end of said frame for rotation about a transverse axis and connected with said baling mechanism to drive the latter, a secondary frame fixed to the side of said main frame and extending laterally therefrom in the direction of offset of said point of draft connection, a gear box mounted on said secondary frame and disposed outside the plane of rotation of the adjacent wheel substantially in longitudinal alignment with said point of draft connection, a power shaft extending forwardly from said gear box on an axis disposed substantially parallel with the direction of travel and rotatably supported near the front end of said draft member, means extending closely adjacent said point of draft connection for transmitting power to said shaft from the tractor engine, a second shaft extending laterally inwardly from said gear box toward said main frame and suitably connected within said gear box with said power shaft, a flywheel mounted on said second shaft, and a flexible endless power transmitting member extending forwardly to connect said second shaft in driving relation with said bull gear.

3. A field hay press comprising, in combination, a fore and aft extending main frame, a transverse supporting axle at the intermediate portion of said frame, wheels mounted on opposite ends of said axle outside said frame, a draft member connected adjacent one end of said axle and extending obliquely forwardly and laterally beyond the forward end of said frame to a point of draft connection outside the plane of rotation of the wheel at the other end of said axle, means supporting the forward end of said main frame on the intermediate portion of said draft member, the latter being adapted to be pivotally supported on a tractor, baling mechanism carried on said frame, a bull gear journaled near the forward end of said frame for rotation about a transverse axis and connected with said baling mechanism to drive the latter, a secondary frame fixed to the side of said main frame and extending laterally therefrom in the direction of offset of said point of draft connection, a gear box mounted on said secondary frame and disposed outside the plane of rotation of the adjacent wheel substantially in longitudinal alignment with said point of draft connection, a power shaft extending forwardly from said gear box on an axis disposed substantially parallel with the direction of travel and rotatably supported near the front end of said draft member, means extending closely adjacent said point of draft connection for transmitting power to said shaft from the tractor engine, a second shaft extending laterally inwardly from said gear box toward the main frame and suitably connected within said gear box with said power shaft, a flywheel mounted on said second shaft, a jackshaft disposed to the rear of and above the axis of said bull gear and parallel thereto, a pinion fixed to said jackshaft and meshed with said bull gear, and a flexible power transmitting member connecting said jackshaft with said second shaft in driving relation.

FRANK D. JONES.